Figure 1:
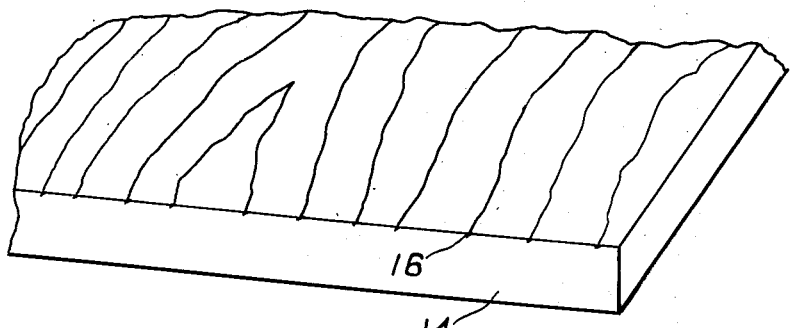

April 5, 1938.   P. R. ZINSER   2,113,166
METHOD OF MAKING DIE PATTERNS
Filed Jan. 6, 1936

INVENTOR.
Paul R. Zinser
BY
Parker & Burton
ATTORNEY.

Patented Apr. 5, 1938

2,113,166

UNITED STATES PATENT OFFICE 2,113,166

METHOD OF MAKING DIE PATTERNS

Paul R. Zinser, Detroit, Mich., assignor to Woodall Industries, Incorporated, Detroit, Mich., a corporation of Michigan Application January 6, 1936, Serial No. 57,743

3 Claims. (Cl. 22—195)

My invention relates to improvements in die patterns and to an improved method of making the same and is particularly applicable to a deep draw pattern wherein surface decoration is provided.

An object is to provide such a pattern of a substantial durable character cheaply and expeditiously. Another object is to provide such a pattern with a facing which carries decorative surface design that is to be imparted to the die, and which facing is flexible and stretchable whereby it may be secured to a base form having a deep draw contour, and which facing is strong, tough, and durable by nature.

A further object is to provide an improved facing for such a pattern which facing is formed of a material possessing the characteristics above described, which material may, in fluid form, be sprayed or otherwise applied to the surface of the matrix from which the surface decoration is to be taken. The material dries or hardens to form a stretchable sheet over the matrix. This sheet upon removal may be applied to the deep draw contoured face of any suitable base to complete the pattern.

More particularly an object is to provide such a pattern comprising a base formed of any suitable material such as plaster, wood, metal, or the like, and a facing for said base formed of a sheet of rubber, which rubber sheet carries the desired surface decoration and which may be flexed or stretched to conform to the deep draw contoured surface of the base. Specifically the rubber sheet is formed of rubber latex which has been sprayed upon the face of the surface matrix and allowed to harden thereon in sheet form.

A meritorious characteristic resides in the application of the liquid which hardens to form the facing by pressure spraying which serves to cause the liquid to intimately contact with the small depressions and crevices which make up the design on the surface of the matrix so that precise reproduction of the smallest detail of grained leather design or textile configuration or whatever may have been used to form the surface decoration is the result.

A further advantage of this type of facing as compared with a facing formed of wax or the like is that in addition to being stretchable to accommodate itself to the contoured surface of the base such a facing is of a tough and durable character so that the pattern may be stored without injury and it may be used repeatedly without resulting deterioration.

Figure 2:
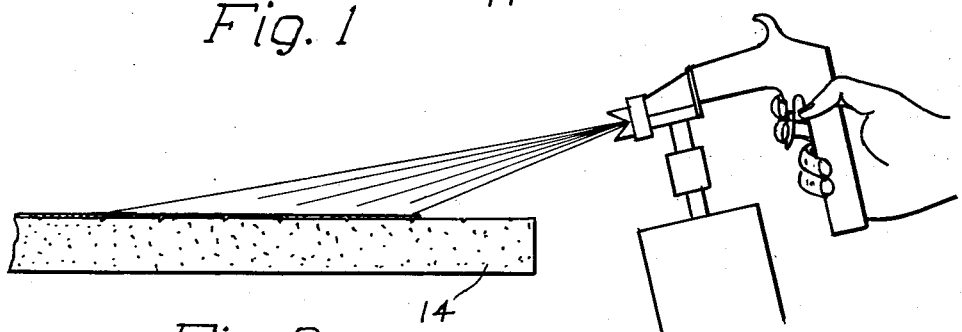
Figure 3:
Figure 4:
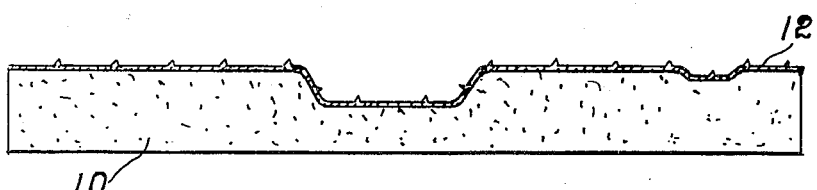

Other objects, advantages, and meritorious features of my invention will more fully appear from the following specification, appended claims, and accompanying drawing, wherein:

Figure 1 is a perspective of a surface matrix upon which my improved facing is formed, Fig. 2 is a schematic diagram showing the application of liquid material to the surface of the matrix in the forming of the sheet, Fig. 3 is an illustrative diagram showing the separation of the sheet from the matrix, and Fig. 4 is an elevation of a conventional base form with the facing applied thereto.

In carrying out my invention I have shown the same in connection with a pattern adapted to be used in the manufacture of a deep draw die having a configured surface. It possesses particularly utility in connection with such a pattern wherein the surface of the die is deeply contoured. Such dies are frequently required in the stamping of panels used in the interior of the automobile bodies. An example is the dash panel which may be required to be bumped out to accommodate for various projecting engine parts. This panel may be formed of a thermoplastic composition fibrous material capable of being so shaped. It is common practice to provide surface decoration in the form of graining, imitation leather, textile fabric or the like for such panels and the dies are formed to produce this result.

Heretofore it has been the practice to provide a die of this kind with a facing of copper or the like. This facing was formed in the flat upon a master matrix. Stripped as a flat sheet from the master matrix it then had to be fitted to the contoured surface of the base form. This fitting commonly resulted in mutilation and defacement of the surface design. It frequently required piecing and patching of the facing to fit it to the contoured surface. Another commercial practice is in my Patent No. 1,979,132, wherein the use of a wax facing is described. Such a facing possessed substantial superiority to the copper facing in the method of its preparation and application. It constituted a facing which was relatively weak and fragile and readily subject to injury or defacement. Such pattern was commonly capable of being used only once. Furthermore, such a facing while flexible to accommodate itself to a deep draw contour was not stretchable and it therefore was frequently necessary to piece and patch the same to accommodate it to the contoured face of the base form and this required careful work and frequently resulted in unsatisfactory reproduction of the intended design.

In carrying out my invention I employ a base form which may be indicated as 10 in Fig. 4 and which has a contoured surface of the conventional character. It will be understood that such a base form frequently has a deep draw contour far more pronounced than that illustrated. To the contoured face of this form is secured my improved facing 12. This facing is formed of a rubber sheet which is produced by the spraying of latex on the master matrix 14 as shown in Fig. 2.

The master matrix is provided with a grained surface having depressions and configurations such as indicated as 16. These lines are shown as relatively far apart in the view in Fig. 1. In actual practice they are relatively closely associated. In reproducing an actual surface decoration they would be relatively close together, would vary greatly in depth and the detail would be very fine; too fine for exact reproduction in detail in a drawing such as shown here but as will be well understood. The latex is sprayed in liquid form from a suitable pressure spray device of any conventional character upon the surface of this matrix. Prior to the spraying of the latex upon the surface of the matrix it is desirable that the matrix be immersed in water so as to absorb water to substantially its saturation point without allowing the crevices to become filled therewith. Its immersion may preferably be accomplished as directed in the patent above mentioned wherein it is allowed to absorb the water without the water being allowed to flow over the configured face to fill the surface crevices.

After the latex has been sprayed upon the face of the matrix and allowed to harden to form, adhesive is applied to its upper surface. Any suitable adhesive which will secure it to the contoured face of the base may be employed. The sheet is then stripped from the matrix and the adhesive coated face is applied to the surface of the blank form as shown in Fig. 4 so as to adhere the rubber facing thereto. The upper surface of the facing will then exhibit a reproduction in reverse of the decorated surface of the matrix. The pattern is then complete for the use of the die maker. The die maker may employ the same in a conventional manner by preparing a mold wherein a metal die may be cast. The fabrication of the die from the pattern forms no part of my invention and is a process well understood.

Due to the fact that the latex is applied under pressure it intimately contacts with the smallest detail of the configuration of the matrix so that exact and precise reproduction is the result.

What I claim is:

1. That method of forming a surface decorated die pattern comprising providing a matrix having the desired surface configuration, spraying thereon in fluid form and under sufficient pressure to intimately fill the surface configurations of the matrix a material which will harden into a flexible sheet over the surface of the matrix, allowing the material to harden into the form of a sheet, removing said sheet from the matrix and securing the same as a facing to the base of a pattern.

2. That method of forming a surface configured die pattern comprising providing a matrix having a grained delineated surface, moistening said matrix to substantially its moisture absorption limit without allowing the moisture to directly contact its grained surface, applying a thin layer of liquid latex compound to said grained surface under pressure sufficient to intimately fill the crevices in said surface, allowing said layer of latex compound to harden on said surface to form a thin flexible and stretchable sheet having one side thereof permanently configured with grained delineations, applying a layer of adhesive material to the top surface of said sheet of latex compound while the same is retained upon said matrix, stripping said sheet of latex compound from said matrix, and applying the adhesive coated surface of said sheet to a substantially rigid base form and stretching and flexing said sheet to accommodate the same to the surface formation of said base form before the sheet is firmly secured thereto.

3. That method of forming a surface decorated die pattern comprising providing a matrix having a decorative surface of minute elevations and depressions, applying a thin layer of liquid latex compound over said surface under pressure to force the compound into the minute depressions of the surface, allowing said layer of latex compound to harden into a thin elastic sheet of latex compound having a decorative surface of minute elevations and depressions complementary to the decorative surface of said matrix, stripping said sheet of latex compound from said matrix, securing the back undecorated side of said sheet of latex compound to a contoured surface of a substantially rigid base form, and stretching and flexing said sheet as it is applied to the contoured surface of said base form to provide complete surface engagement between the back side of said sheet and the contoured formation of the surface of said base form.

PAUL R. ZINSER.